Patented Feb. 16, 1932

1,845,330

UNITED STATES PATENT OFFICE

ERNEST J. PIEPER, OF LANCASTER, PENNSYLVANIA, ASSIGNOR TO ARMSTRONG CORK COMPANY, OF LANCASTER, PENNSYLVANIA, A CORPORATION OF PENNSYLVANIA

RESINOUS CONDENSATION PRODUCTS AND PROCESS OF MAKING

No Drawing. Application filed June 17, 1929. Serial No. 371,683.

The present invention relates to resinous condensation products and the process of making the same, and more especially to a resinous condensation product formed from polyhydric alcohols, polybasic acids and oxidized fatty acids.

When molecular proportions of a polyhydric alcohol and a polybasic acid are heated together, a resinous condensation product is obtained known as an alkyd resin. One example of an alkyd resin is that produced by heating glycerine and phthalic anhydride. A modified alkyd resin may be produced by the addition of a fatty acid or acids to the polyhydric alcohol and polybasic acid. The addition of the fatty acid increases the flexibility of the resin. Heretofore such alkyd resins have been made by the use of a raw or unoxidized fatty acid. The stability of the resinous product obtained was, in part, dependent upon the rate of oxidation of the unsaturated fatty acids employed. For example, when the fatty acids of linseed oil were used, the flexibility of the resinous condensation product was not a permanent characteristic because of the progressive absorption of oxygen by the unsaturated fatty acids of the oil.

The present invention differs from such prior practice in employing oxidized fatty acids, thus initially forming a resinous condensation product having the desired stability and also overcoming certain difficulties in manufacture encountered in using unoxidized fatty acids. The oxidized fatty acids employed are preferably those obtained from the siccative oils, such as the so-called drying oils, linseed oil and Chinawood oil, and the so-called semi-drying oils, such as fish oil, soya bean oil, etc. The fatty acids in linseed oil are principally linolic, linolenic, isolinolenic, oleic, and palmitic and stearic acids. The oxidized fatty acids are obtained by bowing air through the fatty acids at a comparatively low temperature until the desired consistency is reached. When the resinous condensation product is to be used in solution in a solvent to form a lacquer, varnish or paint, a larger proportion of the oxidized fatty acid is used so as to give greater plasticity or flexibility to the resin. Also, the acid is preferably only partially oxidized by the pre-treatment with air. When a tough plastic material is to be formed, such as for use as a binder in the making of fibrous or cork-containing compositions, such as linoleums and other floor covering, wall covering, etc., the oxidation of the fatty acids is carried to a point where solidification or substantially complete oxidation of the unsaturated fatty acids is obtained. The flexibility of the binder can be controlled by the amount of oxidized fatty acids used in making the polyhydric alcohol-polybasic acid condensation product.

In producing a varnish, lacquer, or paint vehicle, drying oil fatty acids are blown with air at a temperature of 60° to 83° centigrade for a period of eight to sixteen hours, depending somewhat upon the degree of flexibility that it desired in the final film. This blowing time will result in partial oxidation of the fatty acids. For the production of plastic binding materials for use in forming composition tiles, such as cork tiles and floor coverings such as linoleum, wall decorations, etc., the oxidation is preferably carried to substantial completion and what is generally recognized as the end point in oxidation methods. The time required varies from twenty-four to thirty-two hours and a solid product is obtained.

To produce a plastic binder, 50 parts of glycerine are heated with 80 parts of phthalic anhydride so that the temperature gradually rises to 180° centigrade. The heating is continued until a soft and viscous resin is obtained. At this point 125 parts of the solid substantially completely oxidized drying oil fatty acids are added. Quite a vigorous reaction takes place at first, accompanied with the evolution of considerable gas and foaming of the reaction substances. The material should be stirred until this violent reaction has subsided. The temperature may then be raised to about 200° centigrade until the desired condensation product is reached. There is a tendency for the mass to solidify in final stages.

The preoxidation of the fatty acids overcomes the difficulty encountered where a raw or unoxidized fatty acid has been used. If in the process described above, a raw fatty acid was added to the soft viscous resin, an immiscible layer would be initially formed because no reaction would take place until the temperature was raised to 200° centigrade, or the mixture had been allowed to stand for some time at 180° centigrade. In using an oxidized fatty acid, an immediate reaction is had.

The resin may be dissolved to form a paint or varnish by the use of well known solvents, such for example as the ethers of ethylene glycol and the ethers of di-ethylene glycol; ethyl acetate; ethylene di-chloride; solvent naphtha or a mixture of such solvents. A commercial form of ethylene glycol mono-ethyl ether is sold under the trade name of "Cellosolve" and a commercial form of di-ethylene mono-ethyl ether is sold under the trade name of "Carbitol". The acetates of "Cellosolve" and "Carbitol" may also be employed.

For forming a resin to be used in paint or varnish, the same procedure is followed as in the making of the plastic binder, except that more of the oxidized fatty acid is added. Preferably the oxidized fatty acid added is partially oxidized so that some oxidation is secured in the drying of the varnish or paint film.

By using an oxidized fatty acid or mixture of oxidized fatty acids in preparing the resinous condensation products for paint or varnish films or for impregnating or plastic binder uses, a product is obtained which is more stable than when using a raw fatty acid because such product is not so susceptible to further oxidation so that its characteristics are not materially altered by exposure to the air over a period of time.

Ethylene glycol, di-ethylene glycol or other polyhydric alcohols or mixtures of polyhydric alcohols that condense with a polybasic acid or mixture of polybasic acids may be used in place of or in combination with glycerine. Polybasic acids other than phthalic anhydride, such as malic acid, citric acid, succinic acid, etc., or mixtures of polybasic acids may be used. Instead of first mixing and heating the polyhydric alcohol and polybasic acid and afterward adding the oxidized fatty acid, all of the components may be added at the same time.

It is believed that the esterification of the polyhydric alcohol and polybasic acid is the first reaction and that this is followed by the phenomenon sometimes referred to as condensation or polymerization, during which the oxidized fatty acid goes into combination.

As above pointed out, the raw fatty acids are preferably oxidized to substantially the end point of the oxidizing reaction obtained by the air blowing, although the oxidation may be stopped short of substantially complete oxidation, and therefore the term "oxidized fatty acid" is intended to include the partially oxidized as well as the fully oxidized material.

While the preferred embodiment of the invention has been specifically described, it is to be understood that the invention is not so limited, but may be otherwise embodied and practiced within the scope of the following claims.

I claim:

1. The process of forming the herein described product which comprises heating together a mixture containing a polyhydric alcohol and an organic polybasic acid and an oxidized fatty acid.

2. The process of producing a resinous condensation product which comprises combining a polyhydric alcohol and an organic polybasic acid to form an alkyd resin and modifying such resin by combining therewith during its condensation an oxidized fatty acid.

3. The process of forming a resinous condensation product which comprises heating together a mixture containing a polyhydric alcohol and an organic polybasic acid to form an alkyd resin in its initial state and adding to such mixture with heat an oxidized fatty acid which combines with such initial product to form a modified alkyd resin.

4. An alkyd resin formed by the combination and condensation of a polyhydric alcohol and an organic polybasic acid and an oxidized fatty acid.

5. An alkyd resin containing an oxidized fatty acid combined therewith during the resin-forming condensation reaction.

In testimony whereof I have hereunto set my hand.

ERNEST J. PIEPER.

DISCLAIMER 1,845,330.—*Ernest J. Pieper*, Lancaster, Pa. RESINOUS CONDENSATION PRODUCTS AND PROCESS OF MAKING. Patent dated February 16, 1932. Disclaimer filed May 10, 1934, by the assignee, *Armstrong Cork Company*.

Hereby disclaims from the claims of said patent the use of oxidized fatty acids except those obtained by oxidizing fatty acids, as distinguished from acids obtained by the hydrolysis of blown drying oils.

[*Official Gazette May 29, 1934.*]